United States Patent [19]

Cheney

[11] Patent Number: 4,557,177

[45] Date of Patent: Dec. 10, 1985

[54] ELECTROMECHANICAL ACTUATOR

[75] Inventor: Joseph J. Cheney, West Seneca, N.Y.

[73] Assignee: C.T.M. Company, Inc., Buffalo, N.Y.

[21] Appl. No.: 488,686

[22] Filed: Apr. 26, 1983

[51] Int. Cl.$^4$ ............... G05G 17/00; H01R 13/54; F41F 5/02; B64D 1/04

[52] U.S. Cl. .................................. 89/1.51; 74/2; 333/12; 339/143 R

[58] Field of Search ............ 89/1.5 R, 1.5 G, 1.5 H, 89/1.5 E, 1.812; 333/12, 185, 167; 74/2, 143 R, 35 R, 65 R, 65 SS; 339/143 R, 14 R, 107; 174/35 C

[56] References Cited

U.S. PATENT DOCUMENTS

| | | | |
|---|---|---|---|
| 963,733 | 7/1910 | Kliegl | 339/107 |
| 2,776,570 | 6/1954 | Nelson et al. | 89/1.5 R X |
| 3,229,582 | 1/1966 | Schlie | 89/1.5 R |
| 3,306,208 | 2/1967 | Bergey et al. | 89/1.5 R X |
| 3,364,752 | 1/1968 | Hjermstad et al. | 89/1.5 R X |
| 3,672,233 | 6/1972 | Hjermstad et al. | 74/2 |
| 3,739,076 | 6/1973 | Schwartz | 174/65 SS |
| 3,784,961 | 1/1974 | Garland | 339/107 |
| 3,951,501 | 4/1976 | Bauerle et al. | 339/107 X |
| 4,120,553 | 10/1978 | Muz | 339/143 R |
| 4,126,372 | 11/1978 | Hashimoto et al. | 339/143 R |
| 4,145,674 | 3/1979 | King et al. | 333/12 X |
| 4,163,956 | 8/1979 | Garlington et al. | 333/185 X |
| 4,243,290 | 1/1981 | Williams | 339/143 R |
| 4,384,263 | 5/1983 | Neuman et al. | 333/185 X |
| 4,386,819 | 6/1983 | Asick et al. | 339/143 R |
| 4,457,576 | 7/1984 | Cosmos et al. | 339/143 R |

FOREIGN PATENT DOCUMENTS

| | | |
|---|---|---|
| 0004094 | 12/1981 | European Pat. Off. . |
| 0070091 | 1/1983 | European Pat. Off. . |
| 398356 | 9/1933 | United Kingdom . |
| 671048 | 4/1952 | United Kingdom . |
| 822303 | 10/1959 | United Kingdom . |

OTHER PUBLICATIONS

Raychem Spec 55 Filter Line Cable, "New Product Bulletin".
Blueprint A2042-84, C.T.M. Company, Inc.
"Electrical Interference", by Rocco F. Ficchi, Hayden Book Co. Inc., N.Y., N.Y., (1964), pp. 46-75.

Primary Examiner—David H. Brown
Attorney, Agent, or Firm—Willian Brinks Olds Hofer Gilson & Lione Ltd.

[57] ABSTRACT

An electromechanical actuator system for use in an aircraft in high frequency electromagnetic environments is disclosed. The system includes an electromechanical switch which responds to a control signal to actuate a device on the airplane. A pair of capacitors is installed in the control signal circuit and the indicator light circuit of the switch within a switch housing. These capacitors cooperate to suppress electromagnetic radiation and voltage transients emitted by the switch. A low pass filter line cable is attached at one end to the switch and at its other end to the source of the control signal and other devices on the aircraft. The individual conductors of this cable are electrically insulated, and these insulated conductors are encased in an electrical shield which is also electrically insulated. To protect the system from high frequency electromagnetic interference, this cable is over 12 inches long, and substantially the entire periphery of the shield is grounded at both ends of the cable.

5 Claims, 5 Drawing Figures

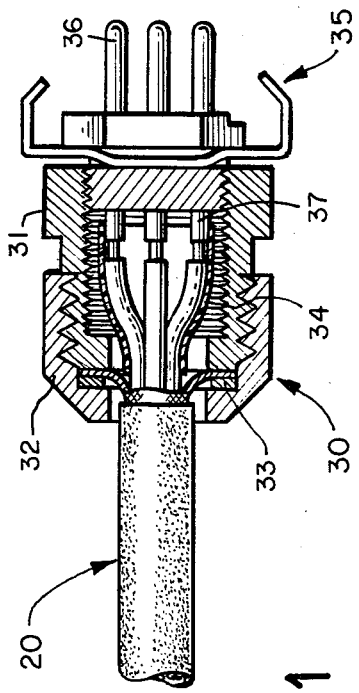
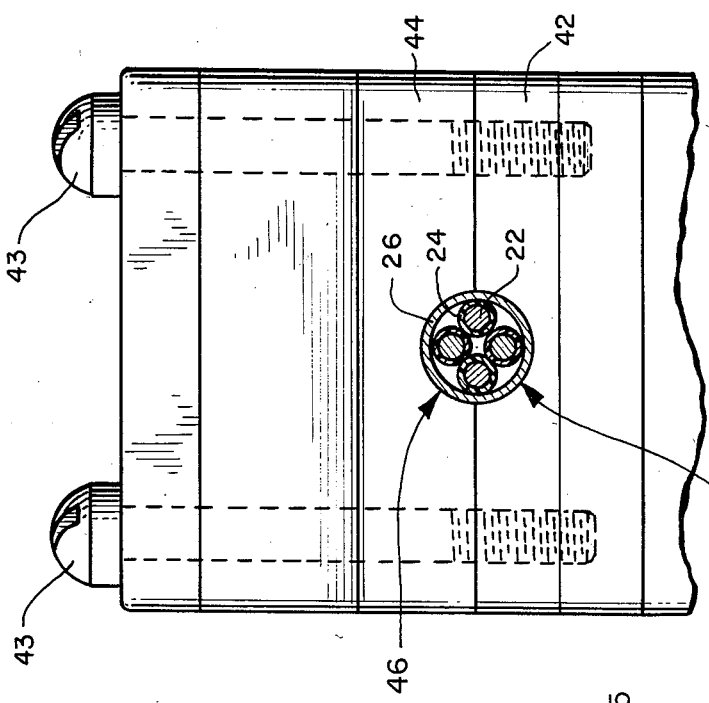
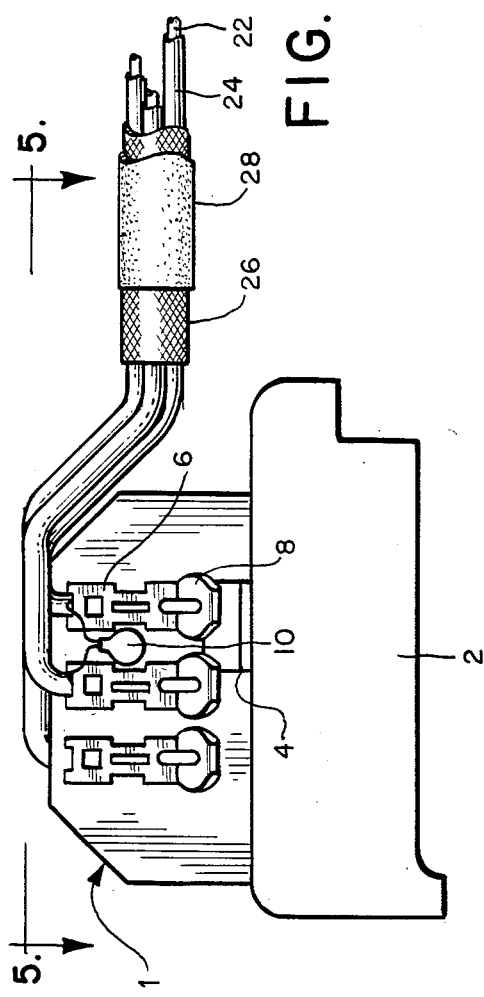
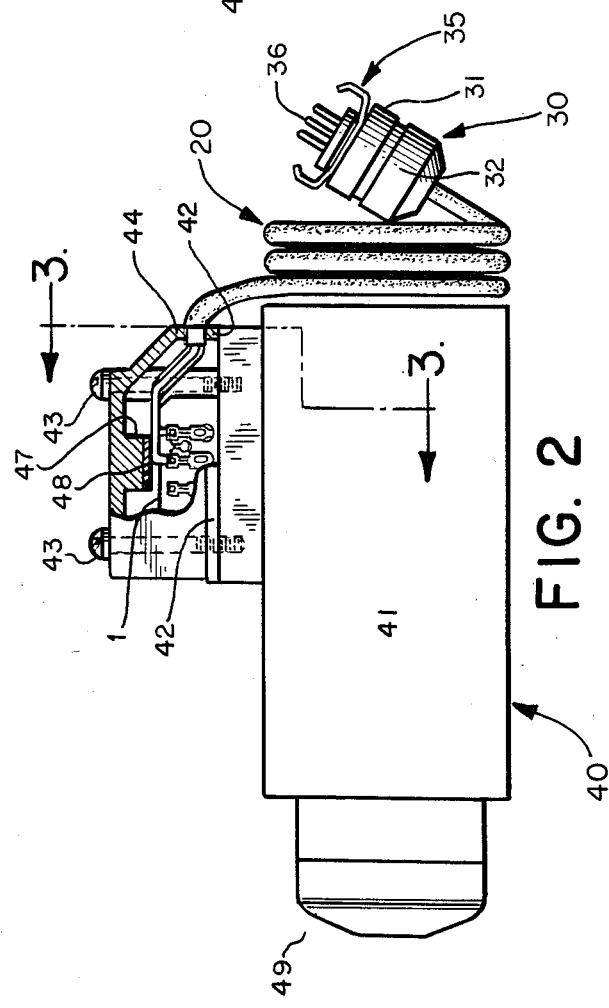
FIG. 1
FIG. 2
FIG. 3

ELECTROMECHANICAL ACTUATOR

BACKGROUND OF THE INVENTION

The present invention generally relates to an electromechanical actuator system for use in vehicles, and more particularly to improvements in such systems in connection with a bomb rack (or bomb shackle) release device of the type disclosed in U.S. Pat. No. 2,776,570 and U.S. Pat. No. 3,364,752.

It is well known that high frequency (over 100 MHz) electromagnetic interference (EMI) can adversely affect the performance of electromechanical devices. Bomb rack actuator systems in aircraft are especially vulnerable to high frequency EMI because of their close proximity to other airborne avionic equipment, such as radar and UHF communications gear, that emits high frequency EMI.

In addition to being susceptible to electromagnetic interference, bomb rack actuators also emit high frequency electromagnetic radiation (over 1 MHz) that can adversely affect the performance of other electrical components in an aircraft, such as the radar system, scanning devices, and the guidance system. The effect of high frequency EMI on these devices is particularly acute because of their close proximity to the bomb rack actuator.

In the prior art, the only effort to suppress electromagnetic emissions from bomb rack actuators consists of grounding the actuator switch to the aircraft. This measure, however, does not satisfactorily suppress high frequency electromagnetic emissions for all applications.

The prior art also attempts to shield bomb rack actuator systems from high frequency EMI. These efforts may include one or more of the following: using ordinary coaxial wire to connect the bomb rack actuator to the source of its control signals and to other devices; either winding the metal braid at the end of the coaxial wire into a pigtail and screwing it to something that was grounded or securing the ends of the braid at both the switch case and the connector plug with rubber; enclosing the connector plug in a plastic shell for electrical insulation; and placing the switch in an aluminum container. Although these measures provide some shielding effect, they do not provide, either alone or in combination, suitable high frequency EMI protection for all uses.

SUMMARY OF THE INVENTION

The present invention is directed to an improved electromechanical actuator system that performs reliably in environments of high frequency electromagnetic emissions, high frequency electromagnetic interference, and high temperatures.

According to this invention, a capacitor is installed in the control signal circuit of the electromechanical switch of the actuator. This capacitor is of sufficiently large capacitance to suppress high frequency emissions while still fitting within the physical dimensions of the switch housing. The invention also includes a specially manufactured multi-conductor filter line cable for connecting the switch to a connector plug. This filter line cable comprises a plurality of conductors that are electrically insulated; the insulated wires are encased in an electrically conductive shield, and the shield is encased in electrical insulation. When this cable is over twelve inches long and substantially the entire periphery of the shield is grounded at both ends, filtering of electromagnetic interference over 100 MHz, in temperatures up to 200° F., is significantly enhanced.

The preferred embodiment of the invention is used in connection with an aircraft bomb rack release device. In this embodiment, the electromechanical switch includes a control signal circuit and an indicator light circuit. A capacitor is installed in each of these circuits that is capable of suppressing electromagnetic emissions over 1 MHz and fitting within the switch housing, which typically covers the switch closely. The switch housing is comprised of two metal sections, each of which contains complementary grooves. When these sections are joined to cover the switch, the boundaries of the respective grooves intersect to form a hole. This hole is used to clamp the perimeter of one end of the shield of the filter line cable. Since the switch housing is grounded to the aircraft, this end of the shield is effectively grounded 360 degrees by the hole. At the connector plug, the perimeter of the shield is secured between the cap and core of a metal clamp. This clamp also is grounded to the aircraft so that the other end of the shield is effectively grounded 360 degrees. Finally, the filter line cable can be shaped into a form compatible with the physical space requirements of bomb rack actuator systems.

The invention, together with further objects and attendant advantages, will be best understood by reference to the following detailed description taken in connection with the accompanying drawings.

BRIEF DESCRIPTION OF THE DRAWINGS

FIG. 1 is a schematic representation of the electromechanical switch assembly, filter line cable, connector clamp and plug of the preferred embodiment of the invention.

FIG. 2 is a schematic representation of a bomb actuator system which includes the preferred embodiment of FIG. 1.

FIG. 3 is a sectional view taken along line 3—3 of FIG. 2.

DETAILED DESCRIPTION OF THE PREFERRED EMBODIMENT

Figure 4:
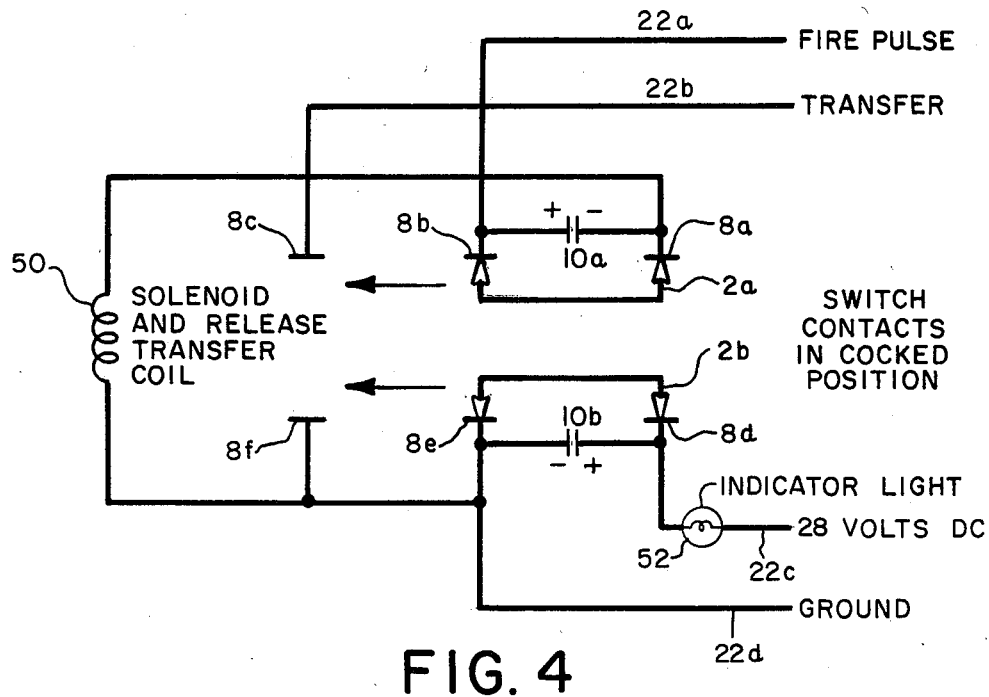
FIG. 4 is a circuit diagram of a bomb actuator system showing the presently preferred location of the capacitors.

Referring now to the drawings, a preferred embodiment of the improved electromechanical actuator system of the present invention will be described in connection with the aircraft bomb rack actuator system shown in FIGS. 1 and 2. FIG. 1 shows an electromechanical switch assembly 1, a filter line cable 20, a connector clamp 30, and a connector plug 35 of the bomb rack actuator system. The switch assembly 1 includes a slider 2, a contact plate 4, terminals 6, and contacts 8. In response to control signals generated in the cockpit, these elements of the switch assembly cooperate with mechanical parts (not shown) of an actuator 40 to actuate a bomb and to change the electrical connections (shown in FIG. 4) of the switch assembly in accordance with the teachings of the above-identified U.S. patents.

Figure 5:
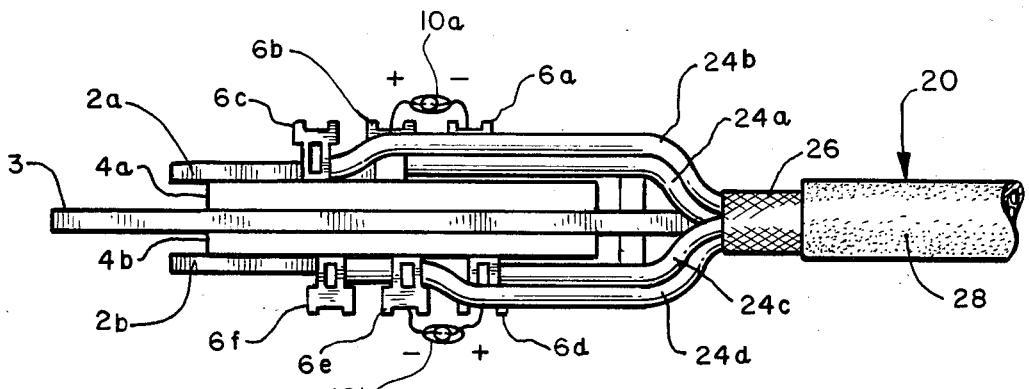
FIG. 5 is a sectional view taken along line 5—5 of FIG. 1.

Switch assembly 1 also includes capacitors 10. FIGS. 4 and 5 show the location and polarity of these capacitors, designated 10a and 10b, in their respective circuits and corresponding terminals. It is preferred that the capacitor 10a installed in the control signal circuit comprises a 3.3 microfarad capacitor and that the capacitor 10b installed in the indicator light circuit comprises a 1.5 microfarad capacitor. These capacitors are of sufficient capacitance to filter high frequency electromagnetic emissions from the switch, where "high frequency emissions" means frequencies above 1 MHz. In order for these capacitors to fit within the confines of the actuator 40 without interfering with the movement of the slider 2, tantalum capacitors are used.

One end of the filter line cable 20 is connected to the terminals 6 of the switch assembly 1. In general, this cable is a low pass filter capable of attenuating high frequency EMI on the order of 5 dB per foot of cable at 100 MHz, 25 dB per foot of cable at 500 MHz, and 90 dB per foot of cable at 1000 MHz. Furthermore, this cable meets these standards in temperatures up to 200° F.

The filter line cable 20 presently used is manufactured by Raychem Corporation, 300 Constitution Drive, Menlo Park, Calif. 94025. The Raychem cable comprises four conductor wires 22 which are soldered to the terminals 6 at one end, as shown in FIG. 5. (FIG. 5 also shows parts of the switch assembly 1 that are not important for purposes of understanding the present invention, such as the switch assembly frame 3.) A spot of Glyptol insulating paint is applied to each of the wire-terminal connections to keep these wires in position. This cable also comprises an electrical insulation material 24 which encases each conductor 22 individually, and a metal braided shield 26 which is disposed around these insulated conductors. A second electrical insulation material 28 encases the shield.

At the other end of the cable 20, the conductors 22 are connected to the connector plug 35. Specifically, these conductors are soldered to the connector pins 37 of the plug, and a long piece of shrink tubing 34 is placed over the conductors and heat shrunk into place. Each pin 37 corresponds to a prong 36 which is adapted to conduct signals transmitted over the wires 22a–d of FIG. 4.

The plug 35 used in the present embodiment is a miniature hexagon connector M4P-LS-H10 manufactured by Winchester Electronics, Division of Litton Systems, Oakdale, Conn. The outermost diameter of this plug is less than one inch, which is necessary to be compatible with existing parameters of the aircraft. To electrically isolate the conductor 22-pin 37 connections, the Winchester plug normally is equipped with a plastic shell. In the present embodiment, this shell is discarded, and the connector clamp 30 is used in its place.

The clamp 30 is comprised of a metal core 31 and a metal cap 32, both of which cooperate to isolate the conductor 22-pin 37 connections and to ground the circumference of the shield 26 360 degrees. This result is accomplished in the following manner. The front of the core 31 is threaded onto the back of the plug 35. Next, the end of the shield 26 is stripped of its insulation 28, and the exposed shield is set firmly against the back of the core. For best grounding results, the length of the exposed shield should correspond exactly to the diameter of the back of the core. A soft solder washer 33 is placed on top of the shield so that the shield rests between the washer and the back of the core. Then, the exposed shield is clamped between the washer and the core by screwing the cap 32 tightly to the core 31 so that the shield will not pull out of the clamp. Finally, the clamp 30 is sealed with a potting compound to keep out dirt and is grounded to the aircraft so that the shield is effectively grounded 360 degrees.

After the clamp 30 has been assembled and the conductors 22 and the capacitors 10 have been connected to the terminals 6, the switch assembly 1 is ready to be assembled into the actuator 40. First, the end of shield 26 nearest the switch assembly 1 is exposed by stripping its insulation 28, and the exposed shield is lightly tinned so that it does not unravel. Next, the coil wires, shown at the contacts 8a and 8f in FIG. 4, are soldered to the terminals 6a and 6f shown in FIG. 5. A spot of Glyptol insulating paint is also applied to these terminals to keep the wires in place. The switch assembly 1 then is secured to the actuator 40 via two mounting slots (not shown) in the actuator.

Turning now to FIG. 2, a switch plate 42 fits around the switch assembly 1 and is attached to the actuator 40 using a conductive gasket compound. The switch assembly then is enclosed by a switch cover 44, which is secured to the switch plate and the actuator by bolts 43. The switch cover includes a projection 47 which operates to hold the switch assembly in place. The actuator 40, switch plate 42, and switch cover 44 and its projection 47 are made of metal so that they may all be grounded, via each other, to the aircraft. Accordingly, an electrical insulation material 48 is placed between the projection 47 and the switch assembly 1 to prevent accidental grounding of the switch. The lower body 41 of the actuator 40 contains mechanical and electrical components, including a plunger 49, which cooperate to actuate the bomb rack in response to control signals received by the switch assembly 1. These mechanical and electrical components, which are not shown, operate in a conventional manner as disclosed in U.S. Pat. Nos. 2,776,570 and 3,364,752.

As shown in FIG. 3, the switch plate 42 and the switch cover 44 each include complementary grooves 45 and 46, respectively. When the switch cover is secured to the switch plate, these grooves form a hole through which the tinned shield of the cable 20 passes. The diameter of this hole is such that the cable 20 is clamped firmly to the switch by the contact between the edges of the hole and the tinned shield so that the cable does not pull out of the switch. Since the switch cover and switch plate are grounded to the aircraft via the actuator 40, the edges of the hole cooperate to ground the shield 26 at the actuator. For best grounding results, it is preferred that the edges of the hole contact the entire periphery of the tinned shield, that the tinned shield does not overlap between the contact surfaces of the plate 42 and the cover 44 beyond the perimeter of the hole, and that the length of the tinned shield is equivalent to the depth of the grooves 45 and 46. This preferred arrangement then operates to effectively ground the shield 26 360 degrees at the switch. Nevertheless, satisfactory grounding results also may be achieved where the edges of the hole contact substantially the entire periphery of the tinned shield and "substantially the entire periphery" means at least 80% of the perimeter of the shield.

The filter line cable 20 of the presently preferred embodiment must be over 12 inches long in order to filter EMI over 100 MHz. When the actuator 40 is installed adjacent the bomb rack (not shown), this cable must be secured out of the way of nearby moving devices, such as bombs, which may damage it. In the present embodiment, the cable 20 is permanently set to the shape shown in FIG. 2 so that it will fit within the ⅜ of an inch clearance between the mounted actuator 40 and plug 35 when the plug is connected to its receptor (not shown). The Raychem cable is shaped by setting it to its desired shape while slightly heating it, taking care not to melt the insulation of the cable. When the cable cools, it will retain its shape.

Operation of the present invention can be explained by reference to FIG. 4, which illustrates the electrical circuit of a bomb rack actuator in its cocked position. The wires 22a-d of this circuit correspond to the conductors 22 of the filter line cable 20. Likewise, the contacts 8a-f, capacitors 10a-b, and sliders 2a-b of FIG. 4 correspond to the contacts 8, capacitors 10, and slider 2 of FIG. 1, respectively.

Operation of this system usually is initiated in the cockpit by pushing an activation button, which generates a control signal on the fire pulse line 22a. The circuit formed by the slider 2a across the contacts 8a and 8b allows a solenoid coil 50 to be energized by this control signal. The energized coil 50 prepares the plunger (shown in FIG. 2) to be released, as explained in U.S. Pat. No. 2,776,570. While the switch is in its cocked position, an indicator light 52 is illuminated through the circuit formed by the slider 2b across the contacts 8d and 8e and the wires 22c and 22d. This light indicates that the switch is cocked and ready to actuate its associated bomb.

Upon interruption of the control signal, for example, by releasing the activation button, the coil 50 is de-energized, thereby allowing the sliders 2a and 2b to be shifted left to engage the contacts 8c and 8b and the contacts 8f and 8e, respectively. The circuit formed by the slider 2b across the contacts 8e and 8f turns off the indicator light 52, thereby indicating that the bomb associated with this actuator has been released. Subsequent control signals generated over the fire pulse line 22a by repeated pushing of the activation button will be transferred over the transfer line 22b to the electrical circuit of the next bomb rack via the circuit formed by the slider 2a across the contacts 8b and 8c. In this manner, the coil 50 is not re-energized by subsequent control signals.

The capacitors 10a and 10b, as shown in FIG. 4, operate to suppress large voltage spikes which are usually generated when the coil 50 is de-energized by interruption of the control signal and the sliders 2a and 2b begin to move left. These voltage spikes can be a source of electromagnetic radiation that can adversely affect the performance of devices near the actuator. As previously explained, these capacitors can filter electromagnetic radiation for frequencies over 1 MHz.

A more detailed description of the circuit illustrated in FIG. 4 and its interaction with the mechanical parts of the actuator can be found in U.S. Pat. No. 2,776,570 (the '570 patent). The system disclosed in the '570 patent operates generally in the same manner as the system of FIG. 4, except the circuit in the '570 patent contains an extra contact and FIG. 4 contains capacitors 10a-b.

Finally, the preferred embodiment of the present invention shown in FIGS. 1-3 is protected from electromagnetic interference in excess of 100 MHz in temperatures up to 200° F. In sum, this is accomplished by using a low pass filter line cable which is over 12 inches long and by effectively grounding both ends of the shield of this cable 360 degrees. The complementary grooves 45 and 46 of the switch plate and switch cover, respectively, cooperate to ground the shield 360 degrees at the switch, and the clamp 30 is provided to ground the other end of the shield 360 degrees.

It should be understood that various changes and modifications to the preferred embodiment described above will be apparent to those skilled in the art. Such changes can be made without departing from the spirit and scope of the present invention, and without diminishing its attended advantages. It is, therefore, intended that all such changes and modifications be covered by the following claims.

I claim:

1. In an electromechanical actuator system for a bomb rack including electromechanical switch means for responding to a control signal to actuate a bomb rack plunger, an electrically conductive housing for enclosing the switch means, the switch means having a control signal circuit and an indicator light circuit, the improvement comprising:
   a first capacitor installed in the control signal circuit within the housing and a second capacitor installed in the light indicator circuit within the housing;
   a filter line cable including a plurality of conductors which are connected at one end to the switch means, each conductor being encased in a first electrical insulating material, an electrically conductive shield being wrapped around the insulated conductors, the shield being encased in a second electrical insulating material, and the cable being at least 12 inches in length;
   the housing including a first section and a second section and being grounded to a vehicle, each section forming a complementary semi-circular edge of a hole, the shield and the conductors and first insulating material within the shield passing through the hole, the edges of the hole contacting substantially the entire periphery of the shield so that the shield can be grounded through the housing via the edges only and the edges clamping the cable to the housing
   a multi-prong plug to which the other ends of the conductors are connected;
   an electrically conductive connector attached at one end to the plug and at its other end to substantially the entire periphery of the shield nearest the plug, the connector being grounded to a vehicle so that substantially the entire periphery of the shield can also be grounded via the connector; and
   the first and second capacitors and the filter line cable, having its periphery grounded at both ends via the housing and the connector, cooperating to filter and suppress high frequency electromagnetic emissions from the switch and high frequency electromagnetic interference.

2. The improvement of claim 1 wherein the cable is shaped so that it may be secured near the housing such that the end of the cable attached to the connector is less that one inch away from the housing.

3. The improvement of claim 1 wherein the outermost diameter of the plug is less than one inch.

4. The improvement of claim 3 wherein the connector comprises a hollow metal core that connects to the plug at one end and contacts substantially the entire periphery of the shield at its other end, a washer which contacts the shield on its side opposite the core, and a metal cap which clamps substantially the entire periphery of the shield between the core and the washer so that the shield can be grounded to the vehicle.

5. The improvement of claim 4 wherein the the first capacitor is between 3 and 4 microfarads and the second capacitor is between 1 and 2 microfarads.

* * * * *